(12) United States Patent
Tanaka

(10) Patent No.: US 7,782,034 B2
(45) Date of Patent: *Aug. 24, 2010

(54) CONSTANT VOLTAGE POWER SUPPLY CIRCUIT AND METHOD OF CONTROLLING THE SAME

(75) Inventor: Shunsei Tanaka, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/172,093

(22) Filed: Jul. 11, 2008

(65) Prior Publication Data

US 2008/0272754 A1 Nov. 6, 2008

Related U.S. Application Data

(63) Continuation of application No. 11/434,279, filed on May 16, 2006, now Pat. No. 7,408,331.

(30) Foreign Application Priority Data

May 31, 2005 (JP) ............................. 2005-159764

(51) Int. Cl.
*G05F 1/40* (2006.01)
(52) U.S. Cl. ..................................... 323/280; 323/281
(58) Field of Classification Search ......... 323/312–317, 323/270, 274, 275, 280, 281, 284, 285
See application file for complete search history.

(56) References Cited

U.S. PATENT DOCUMENTS 4,168,476 A * 9/1979 Petrizio ...................... 323/300
4,628,250 A 12/1986 Lee
6,051,954 A * 4/2000 Nagao et al. ................ 320/101
7,138,841 B1 11/2006 Li et al.
7,408,331 B2 * 8/2008 Tanaka ....................... 323/280
2004/0174206 A1 * 9/2004 Matsumura ................. 327/541
2008/0036442 A1 2/2008 Noda

FOREIGN PATENT DOCUMENTS

JP 2004-180472 6/2004

* cited by examiner

*Primary Examiner*—Jessica Han
(74) *Attorney, Agent, or Firm*—Dickstein Shapiro LLP

(57) ABSTRACT

A constant-voltage power supply circuit is disclosed that is able to prevent overshoot of an output voltage possibly occurring when changing a constant-voltage circuit in operation and is able to supply a constant output voltage. The constant-voltage power supply circuit includes a first constant-voltage circuit, having a first output transistor and a first output voltage controller, that generates a first reference voltage and generates a first proportional voltage in proportion to a voltage on an output terminal, and a second constant-voltage circuit having a second output transistor and a second output voltage controller that generates a second reference voltage and generates a second proportional voltage in proportion to the voltage on the output terminal. When the first output voltage controller or the second output voltage controller starts operations according to a control signal input from the outside, a rising edge of the first reference voltage or the second reference voltage is delayed so as to be later than a rising edge of the first proportional voltage or the second proportional voltage.

17 Claims, 11 Drawing Sheets

CONSTANT VOLTAGE POWER SUPPLY CIRCUIT AND METHOD OF CONTROLLING THE SAME

This application is a continuation application of U.S. patent application Ser. No. 11/434,279, filed May 16, 2006 now U.S. Pat. No. 7,408,331, the entirety of which is incorporated by reference herein.

BACKGROUND OF THE INVENTION

1. Field of the Invention

The present invention relates to a constant-voltage power supply circuit including plural constant-voltage circuits used for an electronic apparatus which requires a stabilized power supply circuit integrated into a semiconductor integrated circuit, and a method of controlling the constant-voltage power supply circuit; and particularly, to a constant-voltage power supply circuit able to be used in various electronic apparatuses which is able to change the constant-voltage power supply circuit to be used depending on system operating conditions so as to reduce power consumption, and a method of controlling the constant-voltage power supply circuit.

2. Description of the Related Art

FIG. 11 is a circuit diagram illustrating a constant-voltage power supply circuit of the related art, which is able to switch over plural constant-voltage power supply circuits depending on operating situations.

As shown in FIG. 11, a constant-voltage power supply circuit 100 includes two constant-voltage circuits 101 and 102, which share an input terminal IN and an output terminal OUT. The constant-voltage circuit 101 includes an output transistor 111 which is a PMOS transistor, resistors 112, 113, a reference voltage generator 114, an error amplifier 115, and switches 116, 117. The constant-voltage circuit 102 includes an output transistor 121 which is a PMOS transistor, resistors 122, 123, a reference voltage generator 124, an error amplifier 125, and switches 126, 127. The constant-voltage circuits 101 and 102 have the same circuit configuration, and form series regulators, respectively.

The switches 116, 117 are controlled to be switched by an external control signal SCa, and the switches 126, 127 are controlled to be switched by an external control signal SCb. When the external control signal SCa is input to stop operations of the constant-voltage circuit 101, the switches 116, 117 are switched off (disconnection state), thereby operations of the reference voltage generator 114 and the error amplifier 115 are stopped, and current supply to the resistors 112, 113 is stopped.

Similarly, when the external control signal SCb is input to stop operations of the constant-voltage circuit 102, the switches 126, 127 are switched off (disconnection state); thereby operations of the reference voltage generator 124 and the error amplifier 125 are stopped, and current supply to the resistors 122, 123 is stopped.

For example, Japanese Laid Open Patent Application No. 2004-180472 discloses a power supply switching circuit able to supply a constant output voltage under normal operating conditions without dependence on power supply selection while suppressing overshoot and undershoot of the output voltage during power supply switching.

However, when the constant-voltage circuits 101 and 102 share the output terminal OUT, as shown in FIG. 11, when switching the constant-voltage circuits 101 and 102, overshoot of the output voltage may occur.

FIG. 12 is a time chart illustrating waveforms of signals in the constant-voltage power supply circuit 100 as shown in FIG. 11.

As shown in FIG. 12, when switching from the constant-voltage circuit 101 to the constant-voltage circuit 102, due to the control signal SCa, the switches 116, 117 are switched off (disconnection state); meanwhile, due to the control signal SCb, the switches 126, 127 are switched on (connection state). When the switches 126, 127 are OFF, although a divisional voltage VFBb given by the resistors 122 and 123 and a reference voltage Vrb are connected to the grounding voltage GND, once the switches 126, 127 are switched on, the reference voltage Vrb is raised to a preset voltage.

In this process, the time period required for the reference voltage Vrb from the reference voltage generator 124 to reach the preset voltage, and the time period required for the divisional voltage VFBb to reach the reference voltage Vrb are different. Because of this difference, an overshoot voltage occurs. Namely, the divisional voltage VFBb input to the error amplifier 125 is given by resistors 122 and 123, and the error amplifier 125 turns ON the transistor 121 so as to operate in a saturation state until the divisional voltage VFBb reaches the reference voltage Vrb. At this moment, the output voltage Vout rises to a relatively high voltage due to the constant-voltage circuit 101 which is already in operation, and this causes the overshoot.

In an electronic apparatus driven by a battery, in order to extend the operating service life of the battery, it is necessary to reduce the current consumed by the circuit. For this purpose, it is attempted to switch over a number of constant-voltage circuits for operation according to operating situations, thereby reducing the consumption of current. For example, a constant-voltage circuit with large consumption of current is used when a load is large, and a constant-voltage circuit with small consumption of current is used when a load is small or in a standby state. In this way, the consumption of current can be reduced. However, if overshoot occurs as mentioned above when switching over the constant-voltage circuits, it may cause malfunction of the load connected to the circuit.

SUMMARY OF THE INVENTION

The present invention may solve one or more of the problems of the related art.

A preferred embodiment of the present invention may provide a constant-voltage power supply circuit able to prevent overshoot of an output voltage possibly occurring when changing a constant-voltage circuit in operation and able to supply a constant output voltage, and a method of controlling the constant-voltage power supply circuit.

According to a first aspect of the present invention, there is provided a constant-voltage power supply circuit that converts a voltage input to an input terminal to a predetermined constant voltage and outputs the constant voltage, comprising:

a first constant-voltage circuit including
a first output transistor that outputs a current corresponding to a signal input to a control electrode thereof from the input terminal to the output terminal, and
a first output voltage controller that generates a predetermined first reference voltage and generates a first proportional voltage in proportion to a voltage on the output terminal, amplifies a difference between the first reference voltage and the first proportional voltage, and outputs the amplified difference to the control electrode of the first output transistor; and a second constant-voltage circuit including
   a second output transistor that outputs a current corresponding to a signal input to a control electrode thereof from the input terminal to the output terminal, and
   a second output voltage controller that generates a predetermined second reference voltage and generates a second proportional voltage in proportion to a voltage on the output terminal, amplifies a difference between the second reference voltage and the second proportional voltage, and outputs the amplified difference to the control electrode of the second output transistor,
wherein
the first output voltage controller and the second output voltage controller start operations or stop operations according to a first control signal and a second control signal input from the outside, respectively,
when starting operations, a rising edge of the corresponding one of the first reference voltage and the second reference voltage is delayed so as to be later than a rising edge of the corresponding one of the first proportional voltage and the second proportional voltage.

Preferably, the first output voltage controller comprises:
a first delay circuit that delays the first control signal by a predetermined first time period;
a first reference voltage generator that generates and outputs the first reference voltage;
a first divisional voltage circuit that divides the voltage output from the output terminal and generates and outputs the first proportional voltage;
a first error amplifier that controls operations of the first output transistor so that the first proportional voltage becomes equal to the first reference voltage, said first error amplifier starting operations or stopping operations according to the first control signal;
a first power supply switch that is switched according to an output signal from the first delay circuit, and controls power supply to the first reference voltage generator; and
a first output voltage supply switch that is switched according to the first control signal, and controls supply of the voltage on the output terminal to the first divisional circuit.

Alternatively, preferably, the first output voltage controller comprises:
a first reference voltage generator that generates and outputs the first reference voltage;
a first delay circuit that delays the first reference voltage by a predetermined first time period;
a first divisional voltage circuit that divides the voltage output from the output terminal and generates and outputs the first proportional voltage;
a first error amplifier that controls operations of the first output transistor so that the first proportional voltage becomes equal to the output voltage of the first delay circuit, said first error amplifier starting operations or stopping operations according to the first control signal;
a first power supply switch that is switched according to the first control signal, and controls power supply to the first reference voltage generator; and
a first output voltage supply switch that is switched according to the first control signal, and controls supply of the voltage on the output terminal to the first divisional circuit.

According to a second aspect of the present invention, there is provided a constant-voltage power supply circuit that converts a voltage input to an input terminal to a predetermined constant voltage and outputs the constant voltage, comprising:

a first constant-voltage circuit including
   a first output transistor that outputs a current corresponding to a signal input to a control electrode thereof from the input terminal to the output terminal, and
   a first output voltage controller that generates a predetermined first reference voltage and generates a first proportional voltage in proportion to a voltage on the output terminal, amplifies a difference between the first reference voltage and the first proportional voltage, and outputs the amplified difference to the control electrode of the first output transistor; and
a second constant-voltage circuit including
   a second output transistor that outputs a current corresponding to a signal input to a control electrode thereof from the input terminal to the output terminal, and
   a second output voltage controller that generates a predetermined second reference voltage and generates a second proportional voltage in proportion to a voltage on the output terminal, amplifies a difference between the second reference voltage and the second proportional voltage, and outputs the amplified difference to the control electrode of the second output transistor,
   said second constant-voltage circuit having a response speed to a voltage change on the output terminal faster than a response speed of the first constant-voltage circuit to a voltage change on the output terminal,
wherein
the first output voltage controller and the second output voltage controller start operations or stop operations according to a first control signal and a second control signal input from the outside, respectively,
when the second output voltage controller starts operations, a rising edge of the second reference voltage is delayed so as to be later than a rising edge of the second proportional voltage.

Preferably, the second output voltage controller comprises:
a second delay circuit that delays the second control signal by a predetermined second time period;
a second reference voltage generator that generates and outputs the second reference voltage;
a second divisional voltage circuit that divides the voltage output from the output terminal and generates and outputs the second proportional voltage;
a second error amplifier that controls operations of the second output transistor so that the second proportional voltage becomes equal to the second reference voltage, said second error amplifier starting operations or stopping operations according to the second control signal;
a second power supply switch that is switched according to an output signal from the second delay circuit, and controls power supply to the second reference voltage generator; and
a second output voltage supply switch that is switched according to the second control signal, and controls supply of the voltage on the output terminal to the second divisional circuit.

Alternatively, preferably, the second output voltage controller comprises:
a second reference voltage generator that generates and outputs the second reference voltage;
a second delay circuit that delays the second reference voltage by a predetermined second time period;
a second divisional voltage circuit that divides the voltage output from the output terminal and generates and outputs the second proportional voltage;
a second error amplifier that controls operations of the second output transistor so that the second proportional voltage becomes equal to the output voltage of the second delay circuit, said second error amplifier starting operations or stopping operations according to the second control signal;

a second power supply switch that is switched according to the second control signal, and controls power supply to the second reference voltage generator; and a second output voltage supply switch that is switched according to the second control signal, and controls supply of the voltage on the output terminal to the second divisional circuit.

According to a third aspect of the present invention, there is provided a constant-voltage power supply circuit that converts a voltage input to an input terminal to a predetermined constant voltage and outputs the constant voltage, comprising:

a first constant-voltage circuit including a first output transistor that outputs a current corresponding to a signal input to a control electrode thereof from the input terminal to the output terminal, and a first output voltage controller that generates a predetermined first reference voltage and generates a first proportional voltage in proportion to a voltage on the output terminal, amplifies a difference between the first reference voltage and the first proportional voltage, and outputs the amplified difference to the control electrode of the first output transistor; and a second constant-voltage circuit including a second output transistor that outputs a current corresponding to a signal input to a control electrode thereof from the input terminal to the output terminal, and a second output voltage controller that generates a predetermined second reference voltage and generates a second proportional voltage in proportion to a voltage on the output terminal, amplifies a difference between the second reference voltage and the second proportional voltage, and outputs the amplified difference to the control electrode of the second output transistor, wherein the first output voltage controller and the second output voltage controller start operations or stop operations according to a first control signal and a second control signal input from the outside, respectively, when starting operations, in a time period from a time of starting the operations, the corresponding one of the first output transistor and the second output transistor is turned OFF (disconnection state).

Preferably, the first output voltage controller comprises:

a first delay circuit that delays the first control signal by a predetermined first time period;

a first reference voltage generator that generates and outputs the first reference voltage;

a first divisional voltage circuit that divides the voltage output from the output terminal and generates and outputs the first proportional voltage;

a first error amplifier that controls operations of the first output transistor so that the first proportional voltage becomes equal to the first reference voltage, said first error amplifier starting operations or stopping operations according to the first control signal;

a first power supply switch that is switched according to a control circuit, and controls power supply to the first reference voltage generator; and a first output voltage supply switch that is switched according to the first control signal, and controls supply of the voltage on the output terminal to the first divisional circuit.

According to a fourth aspect of the present invention, there is provided a constant-voltage power supply circuit that converts a voltage input to an input terminal to a predetermined constant voltage and outputs the constant voltage, comprising:

a first constant-voltage circuit including a first output transistor that outputs a current corresponding to a signal input to a control electrode thereof from the input terminal to the output terminal, and a first output voltage controller that generates a predetermined first reference voltage and generates a first proportional voltage in proportion to a voltage on the output terminal, amplifies a difference between the first reference voltage and the first proportional voltage, and outputs the amplified difference to the control electrode of the first output transistor; and a second constant-voltage circuit including a second output transistor that outputs a current corresponding to a signal input to a control electrode thereof from the input terminal to the output terminal, and a second output voltage controller that generates a predetermined second reference voltage and generates a second proportional voltage in proportion to a voltage on the output terminal, amplifies a difference between the second reference voltage and the second proportional voltage, and outputs the amplified difference to the control electrode of the second output transistor, said second constant-voltage circuit having a response speed to a voltage change on the output terminal faster than a response speed of the first constant-voltage circuit to a voltage change on the output terminal, wherein the first output voltage controller and the second output voltage controller start operations or stop operations according to a first control signal and a second control signal input from the outside, respectively, when the second output voltage controller starts operations, in a time period from a time of starting the operations, the second output transistor is turned OFF (disconnection state).

Preferably, the second output voltage controller comprises:

a second delay circuit that delays the second control signal by a predetermined second time period;

a second reference voltage generator that generates and outputs the second reference voltage;

a second divisional voltage circuit that divides the voltage output from the output terminal and generates and outputs the second proportional voltage;

a second error amplifier that controls operations of the second output transistor so that the second proportional voltage becomes equal to the second reference voltage, said second error amplifier starting operations or stopping operations according to the output signal from the second delay circuit;

a second power supply switch that is switched according to the second control signal, and controls power supply to the second reference voltage generator; and a second output voltage supply switch that is switched according to the second control signal, and controls supply of the voltage on the output terminal to the second divisional circuit.

Preferably, the predetermined first time period equals the delayed time of the rising edge of the first reference voltage when the first output voltage controller starts operations, which delayed time makes the rising edge of the first reference voltage later than the rising edge of the first proportional voltage.

Preferably, the predetermined second time period equals the delayed time of the rising edge of the first reference voltage when the second output voltage controller starts operations, which delayed time makes the rising edge of the first reference voltage later than the rising edge of the first proportional voltage.

Preferably, the first constant-voltage circuit and the second constant-voltage circuit are integrated in one IC chip.

According to a fifth aspect of the present invention, there is provided a method of controlling a constant-voltage power supply circuit, said constant-voltage power supply circuit converting a voltage input to an input terminal to a predetermined constant voltage and outputting the constant voltage, said constant-voltage power supply circuit including a first constant-voltage circuit having a first output transistor that outputs a current corresponding to a signal input to a control electrode thereof from the input terminal to the output terminal, and a first output voltage controller that generates a predetermined first reference voltage and generates a first proportional voltage in proportion to a voltage on the outputs terminal, amplifies a difference between the first reference voltage and the first proportional voltage, and outputs the amplified difference to the control electrode of the first output transistor; and a second constant-voltage circuit having a second output transistor that outputs a current corresponding to a signal input to a control electrode thereof from the input terminal to the output terminal, and a second output voltage controller that generates a predetermined second reference voltage and generates a second proportional voltage in proportion to a voltage on the output terminal, amplifies a difference between the second reference voltage and the second proportional voltage, and outputs the amplified difference to the control electrode of the second output transistor, said method comprising the step of:

when the first output voltage controller or the second output voltage controller starts operations according to a control signal from the outside, a rising edge of the corresponding one of the first reference voltage and the second reference voltage is delayed so as to be later than a rising edge of the corresponding one of the first proportional voltage and the second proportional voltage.

According to a sixth aspect of the present invention, there is provided a method of controlling a constant-voltage power supply circuit, said constant-voltage power supply circuit converting a voltage input to an input terminal to a predetermined constant voltage and outputting the constant voltage, said constant-voltage power supply circuit including a first constant-voltage circuit having a first output transistor that outputs a current corresponding to a signal input to a control electrode thereof from the input terminal to the output terminal, and a first output voltage controller that generates a predetermined first reference voltage and generates a first proportional voltage in proportion to a voltage on the output terminal, amplifies a difference between the first reference voltage and the first proportional voltage, and outputs the amplified difference to the control electrode of the first output transistor; and a second constant-voltage circuit having a second output transistor that outputs a current corresponding to a signal input to a control electrode thereof from the input terminal to the output terminal, and a second output voltage controller that generates a predetermined second reference voltage and generates a second proportional voltage in proportion to a voltage on the output terminal, amplifies a difference between the second reference voltage and the second proportional voltage, and outputs the amplified difference to the control electrode of the second output transistor, said second constant-voltage circuit having a response speed to a voltage change on the output terminal faster than a response speed of the first constant-voltage circuit to a voltage change on the output terminal, said method comprising the step of:

when the second output voltage controller starts operations according to a control signal input from the outside, a rising edge of the second reference voltage is delayed so as to be later than a rising edge of the second proportional voltage.

According to a seventh aspect of the present invention, there is provided a method of controlling a constant-voltage power supply circuit, said constant-voltage power supply circuit converting a voltage input to an input terminal to a predetermined constant voltage and outputting the constant voltage, said constant-voltage power supply circuit including a first constant-voltage circuit having a first output transistor that outputs a current corresponding to a signal input to a control electrode thereof from the input terminal to the output terminal, and a first output voltage controller that generates a predetermined first reference voltage and generates a first proportional voltage in proportion to a voltage on the output terminal, amplifies a difference between the first reference voltage and the first proportional voltage, and outputs the amplified difference to the control electrode of the first output transistor; and a second constant-voltage circuit having a second output transistor that outputs a current corresponding to a signal input to a control electrode thereof from the input terminal to the output terminal, and a second output voltage controller that generates a predetermined second reference voltage and generates a second proportional voltage in proportion to a voltage on the output terminal, amplifies a difference between the second reference voltage and the second proportional voltage, and outputs the amplified difference to the control electrode of the second output transistor, said method comprising the step of:

when the first output voltage controller or the second output voltage controller starts operations according to a control signal from the outside, in a time period from a time of starting the operations, the corresponding one of the first output transistor and the second output transistor is turned OFF (disconnection state).

According to the present invention, the first constant-voltage circuit and the second constant-voltage circuit share the output terminal, when the first constant-voltage circuit or the second constant-voltage circuit starts operations, a rising edge of the first reference voltage or the second reference voltage in operation is delayed so as to be later than a rising edge of the first proportional voltage or the second proportional voltage. In this way, overshoot of the output voltage is preventable, which possibly occurs when switching over the constant-voltage circuits, and it is possible to supply a constant output voltage.

In addition, since the first constant-voltage circuit and the second constant-voltage circuit share the output terminal, when the first constant-voltage circuit or the second constant-voltage circuit starts operations, in a time period from a time of starting the operations, the first output transistor or the second output transistor is turned OFF (disconnection state). In this way, overshoot of the output voltage is preventable, which possibly occurs when switching over the constant-voltage circuits, and it is possible to supply a constant output voltage.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

First Embodiment

Figure 1:
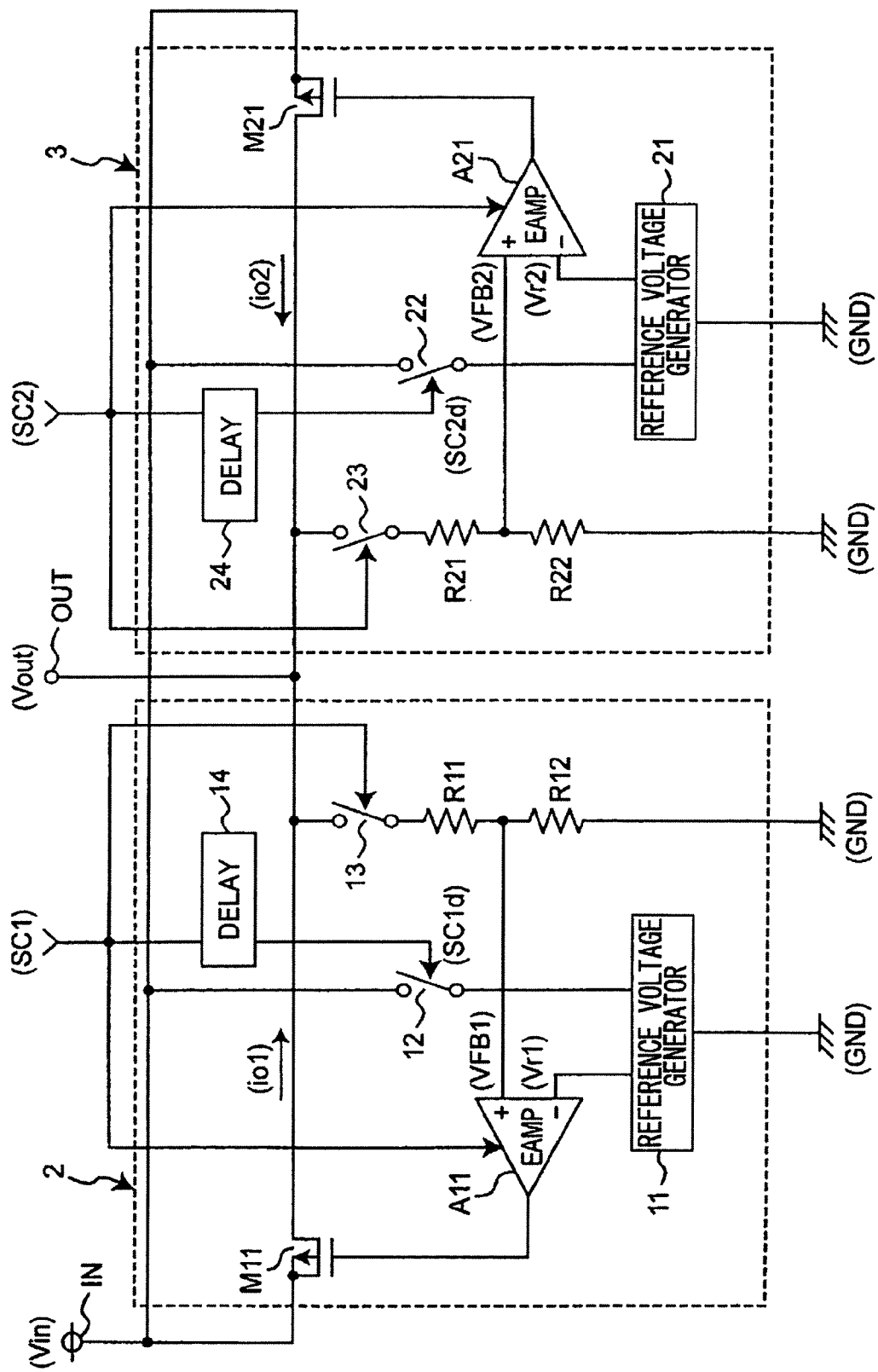
FIG. 1 is a circuit diagram illustrating an example of a constant-voltage power supply circuit according to a first embodiment of the present invention.

FIG. 1 is a circuit diagram illustrating an example of a constant-voltage power supply circuit according to a first embodiment of the present invention.

As shown in FIG. 1, a constant-voltage power supply circuit 1 converts an input voltage Vin input to an input terminal IN to an output voltage Vout output from an output terminal OUT.

The constant-voltage power supply circuit 1 includes a constant-voltage circuit 2 and a constant-voltage circuit 3, which have the same circuit configuration, and each of the constant-voltage circuits 2 and 3 forms a series regulator.

The constant-voltage circuit 2 includes a reference voltage generator 11 which generates and outputs a reference voltage Vr1, resistors R11, R12 which divide the output voltage Vout and generate and output a divisional voltage VFB1, an output transistor M11 which is a PMOS transistor that controls a current io1 corresponding to a signal input to a gate of the transistor M11 and outputs the current io1 to the output terminal OUT, an error amplifier A11 which controls the output transistor M11 so that the divisional voltage VFB1 becomes equal to the reference voltage Vr1, switches 12, 13, and a delay circuit 14.

The constant-voltage circuit 3 includes a reference voltage generator 21 which generates and outputs a reference voltage Vr2, resistors R21, R22 which divide the output voltage Vout and generate and output a divisional voltage VFB2, an output transistor M21 which is a PMOS transistor that controls a current io2 corresponding to a signal input to a gate (electrode) of the transistor M21 and outputs the current io2 to the output terminal OUT, an error amplifier A21 which controls the output transistor M21 so that the divisional voltage VFB2 becomes equal to the reference voltage Vr2, switches 22, 23, and a delay circuit 24.

Here, the constant-voltage circuit 2 corresponds to the first constant-voltage circuit; the output transistor M11 corresponds to the first output transistor; and the reference voltage generator 11, the resistors R11, R12, the error amplifier A11, switches 12, 13, and the delay circuit 14 correspond to the first output voltage controller.

Similarly, the constant-voltage circuit 3 corresponds to the second constant-voltage circuit; the output transistor M21 corresponds to the second output transistor; and the reference voltage generator 21, the resistors R21, R22, the error amplifier A21, switches 22, 23, and the delay circuit 24 correspond to the second output voltage controller.

In addition, the reference voltage generator 11 corresponds to the first reference voltage generator, the resistors R11, R12 correspond to the first divisional voltage circuit, the error amplifier A11 corresponds to the first error amplifier, the switch 12 corresponds to the first power supply switch, the switch 13 corresponds to the first output voltage switch, and the delay circuit 14 corresponds to the first delay circuit.

Similarly, the reference voltage generator 21 corresponds to the second reference-voltage generator, the resistors R21, R22 correspond to the second divisional voltage circuit, the error amplifier A21 corresponds to the second error amplifier, the switch 22 corresponds to the second power supply switch, the switch 23 corresponds to the second output voltage switch, and the delay circuit 24 corresponds to the second delay circuit.

Additionally, a control signal SC1 corresponds to the first control signal, and a control signal SC2 corresponds to the second control signal.

In the constant-voltage circuit 2, the output transistor M11 is connected between the input terminal IN and the output terminal OUT, and the switch 13 and the resistors R11, R12 are connected in series between the output terminal OUT and a grounding voltage GND.

An output terminal of the error amplifier A11 is connected to a gate of the output transistor M11, the divisional voltage VFB1 is input to a non-inverted input terminal of the error amplifier A11, and the reference voltage Vr1 is input to an inverted input terminal of the error amplifier A11.

The reference voltage generator 11 receives an input voltage Vin as a power voltage through the switch 12, controls the switch 13 according to a control signal SC1 from outside, and controls the operations of the error amplifier A11. In addition, the control signal SC1 is delayed by the delay circuit 14, and the delayed control signal SC1d controls the switching operations of the switch 12.

Similarly, in the constant-voltage circuit 3, the output transistor M21 is connected between the input terminal IN and the output terminal OUT, and the switch 23 and the resistors R21, R22 are connected in series between the output terminal OUT and a grounding voltage GND.

An output terminal of the error amplifier A21 is connected to a gate of the output transistor M21, the divisional voltage VFB2 is input to a non-inverted input terminal of the error amplifier A21, and the reference voltage Vr1 is input to an inverted input terminal of the error amplifier A21.

The reference voltage generator 21 receives the input voltage Vin as a power voltage through the switch 22, controls the switch 23 according to a control signal SC2 from outside, and controls the operations of the error amplifier A21. In addition, the control signal SC2 is delayed by the delay circuit 24, and the delayed control signal SC2d controls the switching operations of the switch 22.

Figure 2:
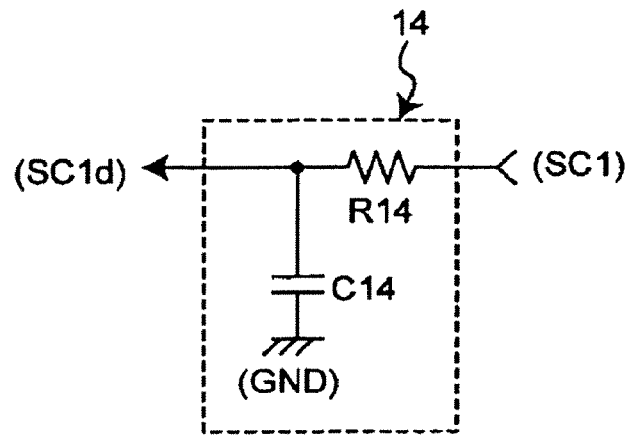
FIG. 2 is a circuit diagram exemplifying the delay circuit in FIG. 1.

FIG. 2 is a circuit diagram exemplifying the delay circuit 14 in FIG. 1.

The delay circuit 24 has essentially the same circuit configuration except that a different resistor and a different condenser are used to have a different time constant, and thus, the overlapping descriptions are omitted.

As shown in FIG. 2, the delay circuit 14 includes a resistor R14 and a condenser C14, the resistor R14 and the condenser C14 are connected in series between the control signal SC1 and the grounding voltage GND, and the delayed control signal SC1d is extracted from the connection point between the resistor R14 and the condenser C14.

Operations of the constant-voltage power supply circuit 1 with the above-described circuit configuration are described with reference to FIG. 3.

Figure 3:
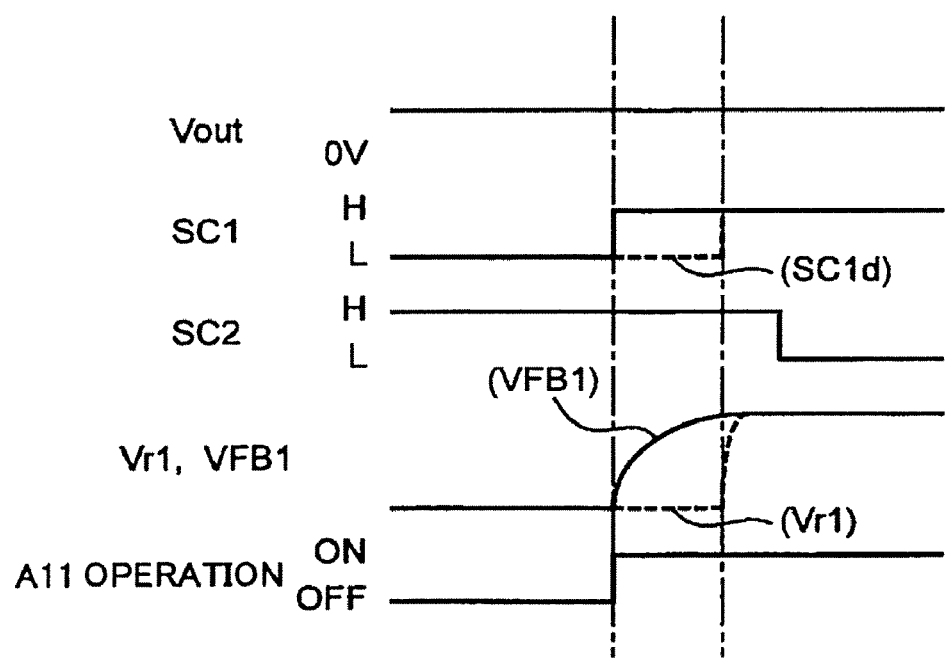
FIG. 3 is a time chart illustrating waveforms of signals in the constant-voltage power supply circuit as shown in FIG. 1.

FIG. 3 is a time chart illustrating waveforms of signals in the constant-voltage power supply circuit 1 as shown in FIG. 1.

In FIG. 3, when the control signal SC1 is at a high level, the constant-voltage circuit 2 starts to operate, and when the control signal SC1 is at a low level, the constant-voltage circuit 2 stops operation. Similarly, when the control signal SC2 is at the high level, the constant-voltage circuit 3 starts to operate, and when the control signal SC2 is at the low level, the constant-voltage circuit 3 stops operation.

When switching from a state in which only the constant-voltage circuit 3 is in operation to a state in which the operation of the constant-voltage circuit 3 is stopped and only the constant-voltage circuit 2 is in operation, the control signal SC1 changes to the high level while the control signal SC2, being at the high level, after a certain time period changes to the low level.

Similarly, when switching from a state in which only the constant-voltage circuit 2 is in operation to a state in which the operation of the constant-voltage circuit 2 is stopped and only the constant-voltage circuit 3 is in operation, the control signal SC2 changes to the high level while the control signal SC1, being at the high level, after a certain time period changes to the low level.

Namely, when the control signal SC1 is at the high level, the switch 13 is turned ON (connection state); at the same time, the error amplifier A11 starts to operate, and after the delay time Td1, which is set in advance in the delay circuit 14, the switch 12 is turned ON (connection state). Additionally, when the control signal SC1 is at the low level, the switch 13 is turned OFF (disconnection state); at the same time, the error amplifier A11 stops operation. After the delay time Td1, the switch 12 is turned OFF (disconnection state).

Similarly, when the control signal SC2 is at the high level, the switch 23 is turned ON (connection state); at the same time, the error amplifier A21 starts to operate, and after the delay time Td2 set in the delay circuit 24, the switch 22 is turned ON (connection state). Additionally, when the control signal SC2 is at the low level, the switch 23 is turned OFF (disconnection state); at the same time, the error amplifier A21 stops operation. After the delay time Td2, the switch 22 is turned OFF (disconnection state).

For example, when the control signal SC1 rises to the high level to drive the constant-voltage circuit 2 to operate, the divisional voltage VFB1, which is input to the non-inverted input terminal of the error amplifier A11, rises gradually. In this process, the switch 12 is turned OFF, and the reference voltage Vr1 from the reference voltage generator 11 becomes the grounding voltage GND. Due to this, the output transistor M11 is still in the OFF state, but the constant-voltage circuit 3 is in operation; therefore, the output voltage Vout is at a constant value. Next, after the preset delay time Td1, the switch 12 is turned ON, and the reference voltage generator 11 outputs the preset reference voltage Vr1.

Here, the delay time Td1 is equal to the time required for the divisional voltage VFB1 to rise as the division of the output voltage Vout after the control signal SC1 is changed to the high level. Additionally, the control signal SC2 changes to the low level after the control signal SC1 is changed to the high level.

In this way, as shown in FIG. 3, the overshoot does not occur in the output voltage Vout.

The process is the same when the control signal SC2 rises to the high level to drive the constant-voltage circuit 3 to operate, and detailed descriptions are omitted.

Figure 4:
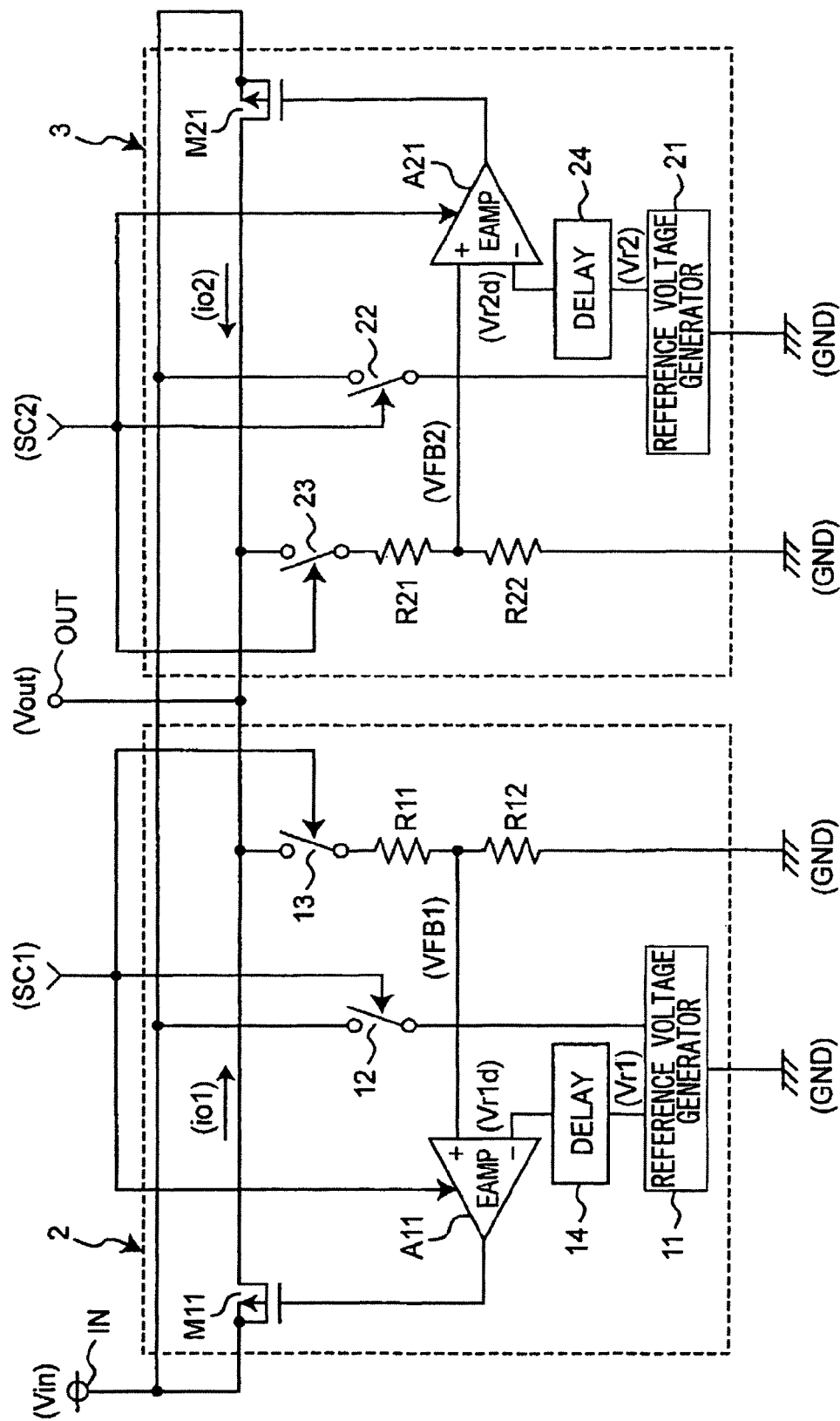
FIG. 4 is a circuit diagram illustrating another example of the constant-voltage power supply circuit according to the first embodiment of the present invention.

FIG. 4 is a circuit diagram illustrating another example of the constant-voltage power supply circuit according to the first embodiment of the present invention.

In the FIG. 1, the power supplies to the reference voltage generators 11, 21 are delayed by delay circuits 14 and 24, respectively. Instead, the reference voltage Vr1 from the reference voltage generator 11 may be delayed by a delay circuit, and input into an inverted input terminal of the error amplifier.

FIG. 4 shows such an example of the constant-voltage power supply circuit. In FIG. 4, the same reference numbers are assigned to the same elements as described in FIG. 1, and only the differences between FIG. 1 and FIG. 4 are described with overlapping descriptions being omitted.

The circuit diagram of the constant-voltage power supply circuit shown in FIG. 4 differs from that in FIG. 1 in that the switch 12 is controlled by the control signal SC1, while the switch 22 is controlled by the control signal SC2. The delay circuit 14 is connected between the output terminal of the reference voltage generator 11 and an inverted input terminal of the error amplifier A11, and the delay circuit 24 is connected between the output terminal of the reference voltage generator 21 and an inverted input terminal of the error amplifier A21.

Operations of the constant-voltage power supply circuit 1 as shown in FIG. 4 are described with reference to FIG. 5.

Figure 5:
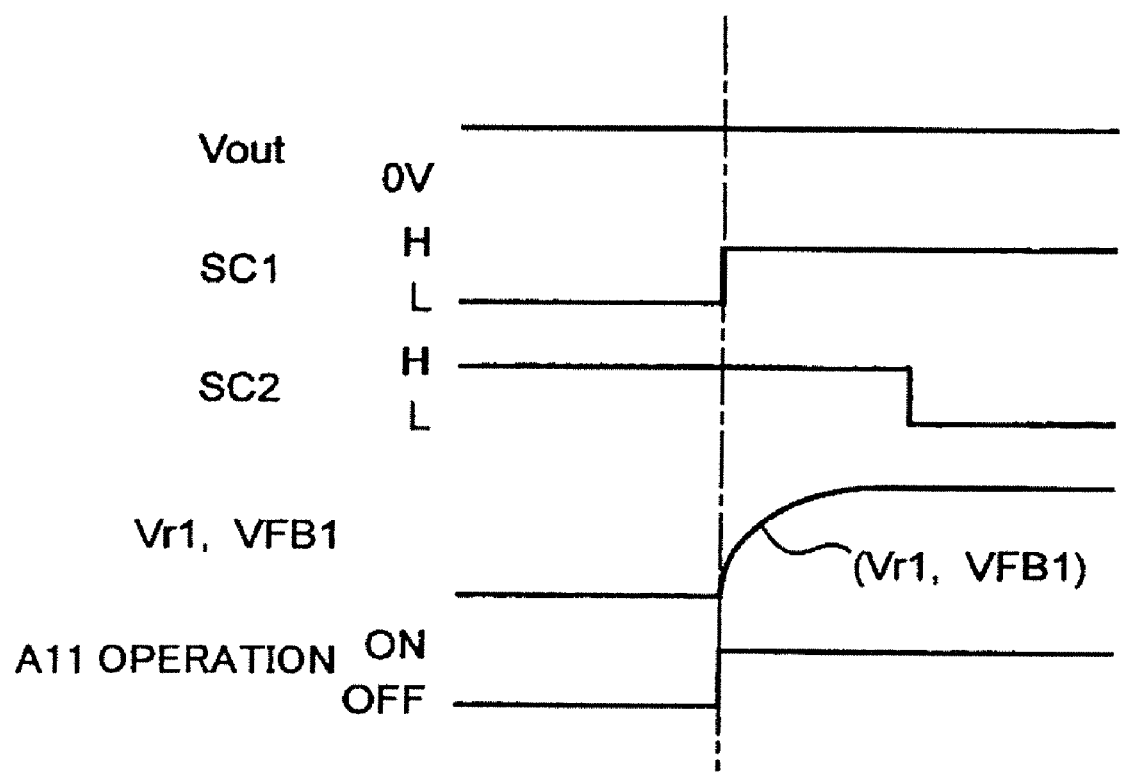
FIG. 5 is a time chart illustrating waveforms of signals in the constant-voltage power supply circuit as shown in FIG. 4.

FIG. 5 is a time chart illustrating waveforms of signals in the constant-voltage power supply circuit as shown in FIG. 4.

When the control signal SC1 is at the high level, the switches 12 and 13 are turned ON (connection state); at the same time, the error amplifier A11 and the reference voltage generator 11 start to operate, and after the delay time Td1, which is set beforehand in the delay circuit 14, the reference voltage Vr1 is input to the inverted input terminal of the error amplifier A11 as a reference voltage Vr1d. When the control signal SC1 is at the low level, the switches 12 and 13 are turned OFF (disconnection state); at the same time, the error amplifier A11 and the reference voltage generator 11 stop operations, and the level of the reference voltage Vr1 decreases according to the time constant of the delay circuit 14.

Similarly, when the control signal SC2 is at the high level, the switches 22 and 23 are turned ON (connection state); at the same time, the error amplifier A21 and the reference voltage generator 21 start to operate, and after the delay time Td2, which is set beforehand in the delay circuit 24, the reference voltage Vr2 is input to the inverted input terminal of the error amplifier A21 as a reference voltage Vr2d. When the control signal SC2 is at the low level, the switches 22 and 23 are turned OFF (disconnection state); at the same time, the error amplifier A21 and the reference voltage generator 21 stop operations, and the level of the reference voltage Vr1 decreases according to the time constant of the delay circuit 24.

In this way, the same effects as those shown with reference to FIG. 1 are obtainable.

Figure 6:
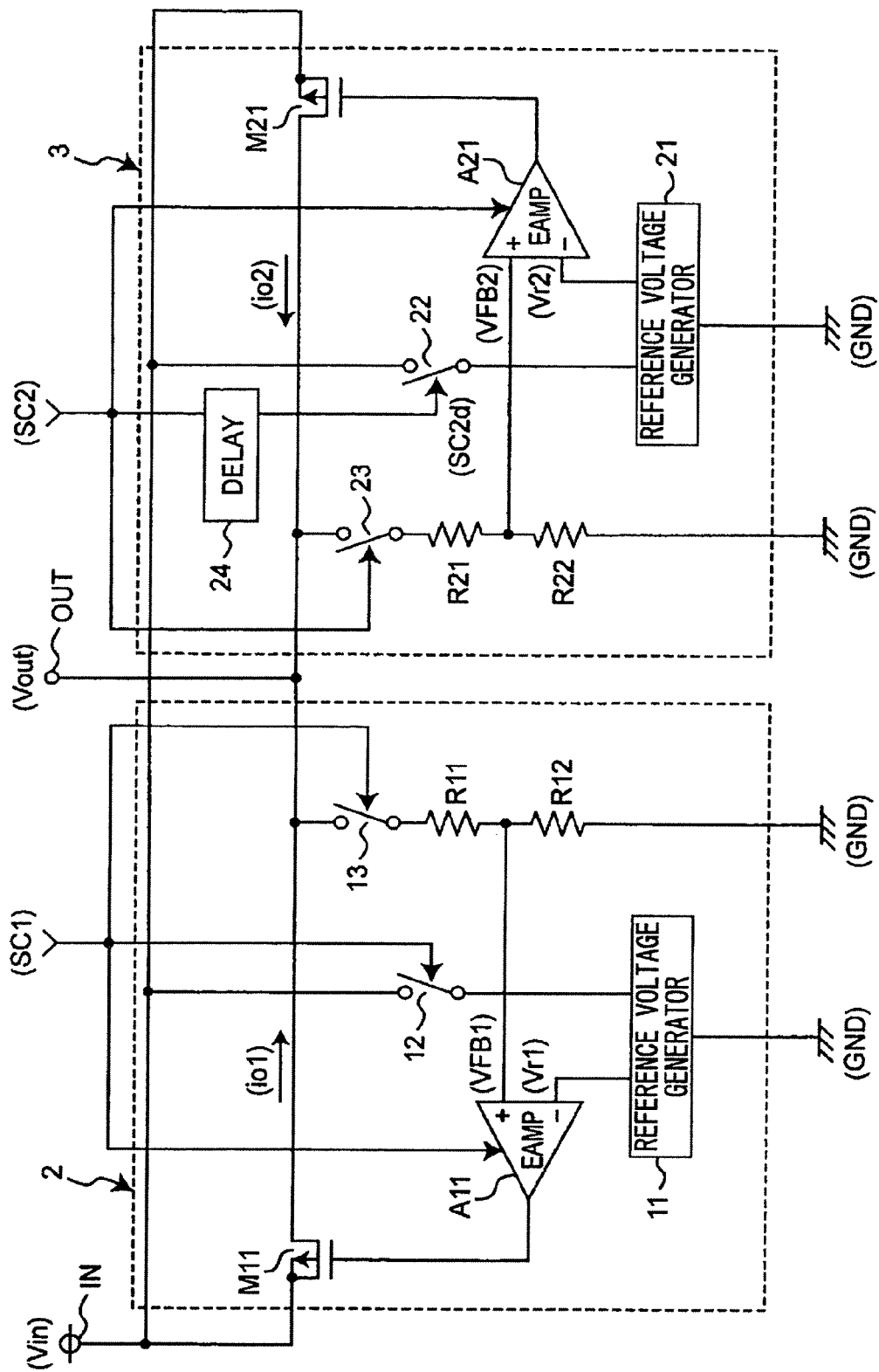
FIG. 6 is a circuit diagram illustrating another example of the constant-voltage power supply circuit according to the first embodiment of the present invention.

FIG. 6 is a circuit diagram illustrating another example of the constant-voltage power supply circuit according to the first embodiment of the present invention.

When the constant-voltage circuit 3 has a faster response to the change of the output voltage Vout than the constant-voltage circuit 2, as shown in FIG. 6, the delay circuit 14 as shown in FIG. 1 may be omitted, and a delay circuit for delaying the control signal SC2 may be provided only in the constant-voltage circuit 3. With such a circuit configuration, similar to that shown in FIG. 3, the overshoot does not occur in the output voltage Vout.

Figure 7:
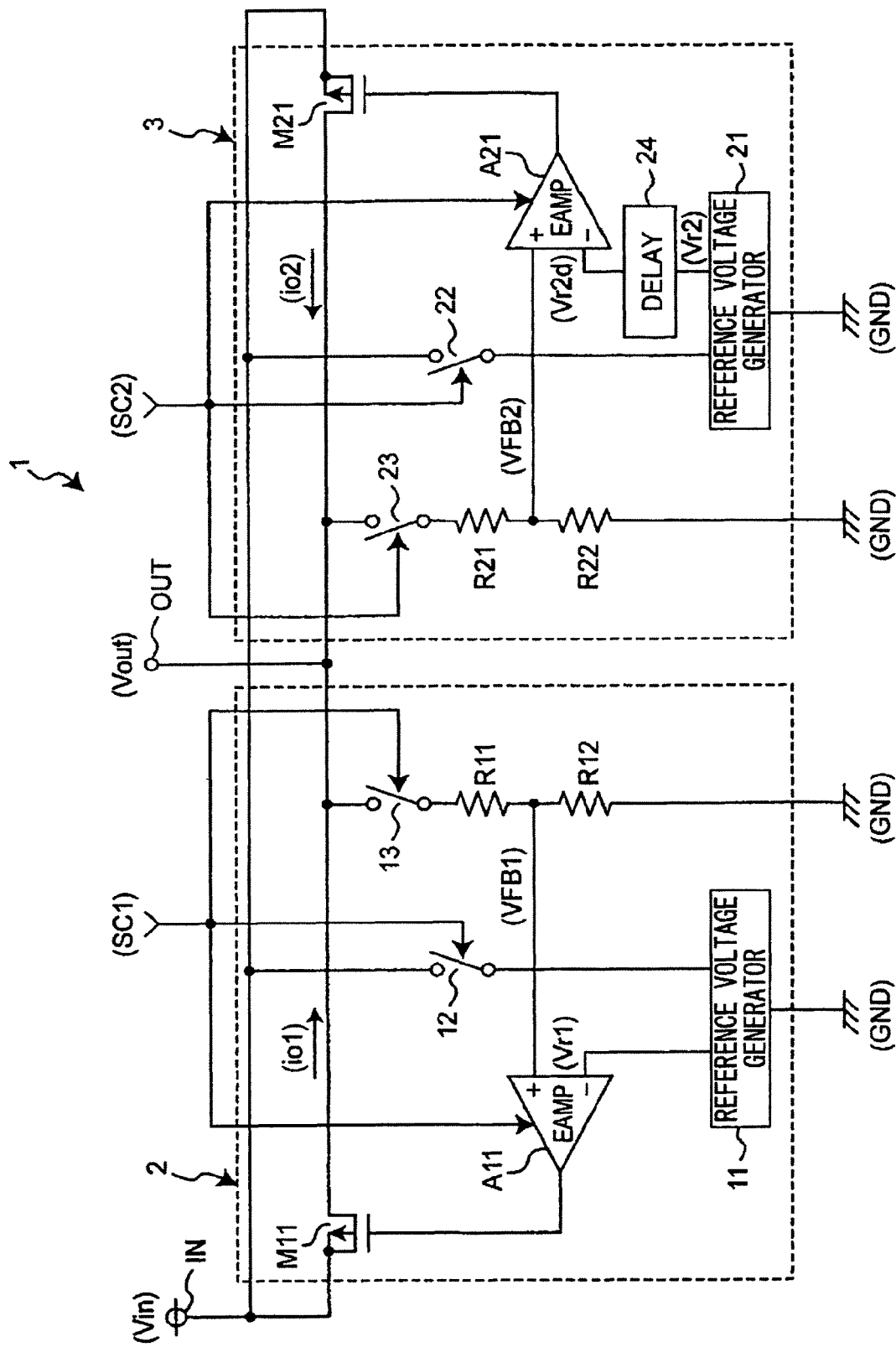
FIG. 7 is a circuit diagram illustrating another example of the constant-voltage power supply circuit according to the first embodiment of the present invention.

FIG. 7 is a circuit diagram illustrating another example of the constant-voltage power supply circuit according to the first embodiment of the present invention.

Similar to FIG. 6, when the constant-voltage circuit 3 has a faster response to the change of the output voltage Vout than that of the constant-voltage circuit 2, as shown in FIG. 7, the delay circuit 14 as shown in FIG. 4 may be omitted, and a delay circuit for delaying the reference voltage from the reference voltage generator and outputting the delayed reference voltage to the error amplifier A11 may be provided only in the constant-voltage circuit 3. With such a circuit configuration, similar to that shown in FIG. 5, the overshoot does not occur in the output voltage Vout.

According to the present embodiment, the constant-voltage circuit 2 and the constant-voltage circuit 3 share the output terminal OUT; when the constant-voltage circuit 2 or the constant-voltage circuit 3 starts operations, the rising edge of the reference voltage, which is to be input to the error amplifier of the constant-voltage circuit in operation, is delayed so as to be later than the rising edge of the divisional voltage input to the error amplifier. Due to this, the overshoot of the output voltage is preventable, which possibly occurs when switching over the constant-voltage circuits, and thus it is possible to supply a constant output voltage.

Second Embodiment

In the first embodiment, the rising edge of the reference voltage is delayed by using a delay circuit so as to be later than the rising edge of the divisional voltage. Instead, the operation start timing of the error amplifier may be delayed by a delay circuit. This is described in the present embodiment.

Figure 8:
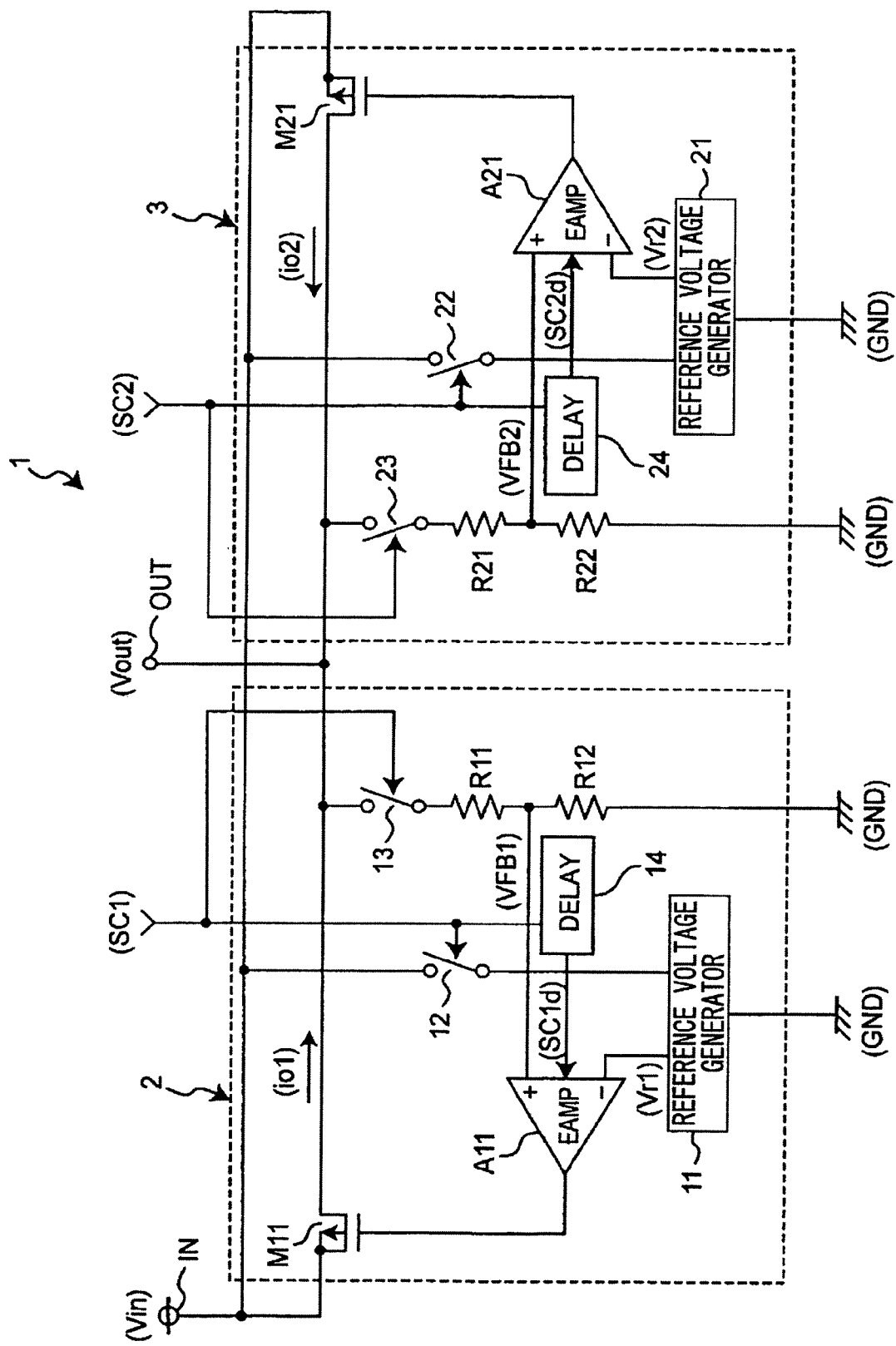
FIG. 8 is a circuit diagram illustrating an example of the constant-voltage power supply circuit according to a second embodiment of the present invention.

FIG. 8 is a circuit diagram illustrating an example of the constant-voltage power supply circuit according to a second embodiment of the present invention.

In FIG. 8, the same reference numbers are assigned to the same elements as described in FIG. 1, and only the differences between FIG. 1 and FIG. 8 are described with overlapping descriptions being omitted.

The circuit diagram of the constant-voltage power supply circuit shown in FIG. 8 differs from that in FIG. 1 in that the switch 12 is controlled by the control signal SC1, while the switch 22 is controlled by the control signal SC2, the error amplifier A11 is controlled by the delayed control signal SC1d from the delay circuit 14, and the error amplifier A21 is controlled by the delayed control signal SC2d from the delay circuit 24.

Operations of the constant-voltage power supply circuit 1 as shown in FIG. 8 are described with reference to FIG. 9.

Figure 9:
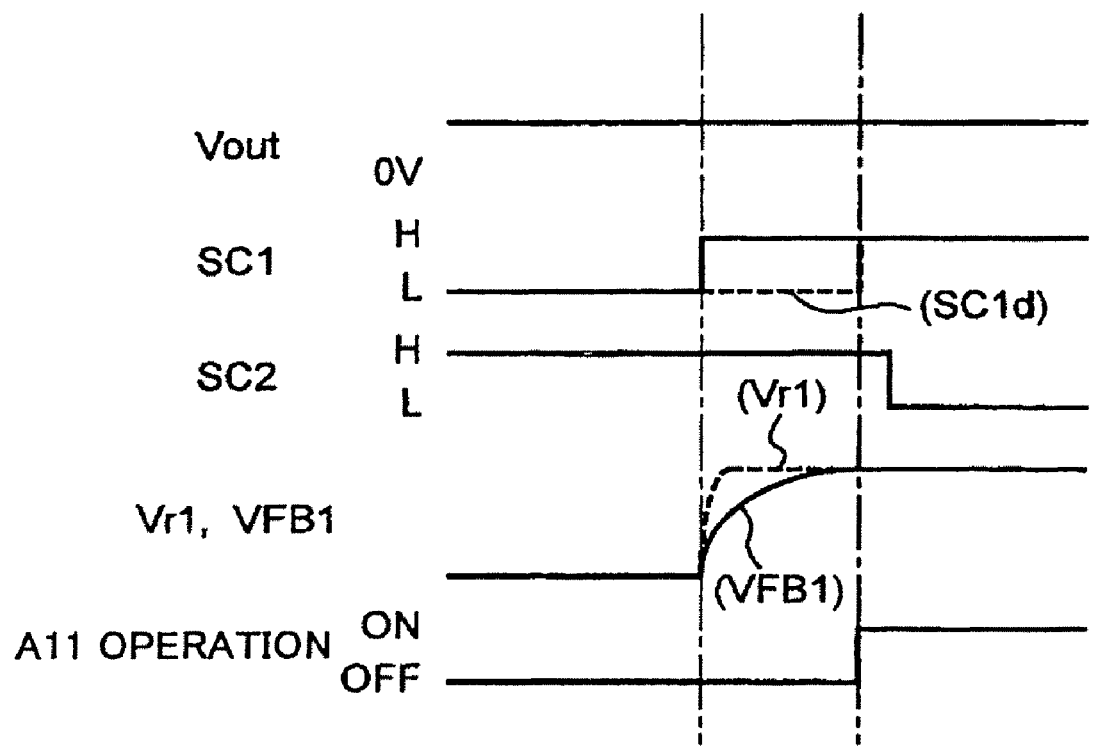
FIG. 9 is a time chart illustrating waveforms of signals in the constant-voltage power supply circuit as shown in FIG. 8.

FIG. 9 is a time chart illustrating waveforms of signals in the constant-voltage power supply circuit 1 as shown in FIG. 8.

When the control signal SC1 is at the high level, the switches 12 and 13 are turned ON (connection state); at the same time, the error amplifier A11 starts to operate, and after the delay time Td1, which is set beforehand in the delay circuit 14, the reference voltage generator 11 starts to operate. When the control signal SC1 is at the low level, the switches 12 and 13 are turned OFF (disconnection state); at the same time, the reference voltage generator 11 stops operations, and after the delay time Td1, the error amplifier A11 stops the operations.

Similarly, when the control signal SC2 is at the high level, the switches 22 and 23 are turned ON (connection state); at the same time, the error amplifier A21 starts to operate, and after the delay time Td2, which is set beforehand in the delay circuit 24, the reference voltage generator 21 starts to operate. When the control signal SC2 is at the low level, the switches 22 and 23 are turned OFF (disconnection state); at the same time, the reference voltage generator 21 stop operations, and after the delay time Td2, the error amplifier A21 stops the operations.

For example, when the control signal SC1 rises to the high level to drive the constant-voltage circuit 2 to operate, the reference voltage generator 11 starts to operates immediately, and the reference voltage Vr1, which is input to an inverted input terminal of the error amplifier A11, rises gradually up to a preset level. The divisional voltage VFB1, which is input to the non-inverted input terminal of the error amplifier A11, rises gradually.

In this process, the error amplifier A11 is not in operation and the output transistor M11 is still in the OFF state, but the constant-voltage circuit 3 is in operation; therefore, the output voltage Vout is at a constant value. Next, after the preset delay time Td1, and the error amplifier A11 starts to operate.

In this way, as shown in FIG. 9, the overshoot does not occur in the output voltage Vout.

The process is the same when the control signal SC2 rises to the high level to drive the constant-voltage circuit 3 to operate, and detailed descriptions are omitted.

Figure 10:
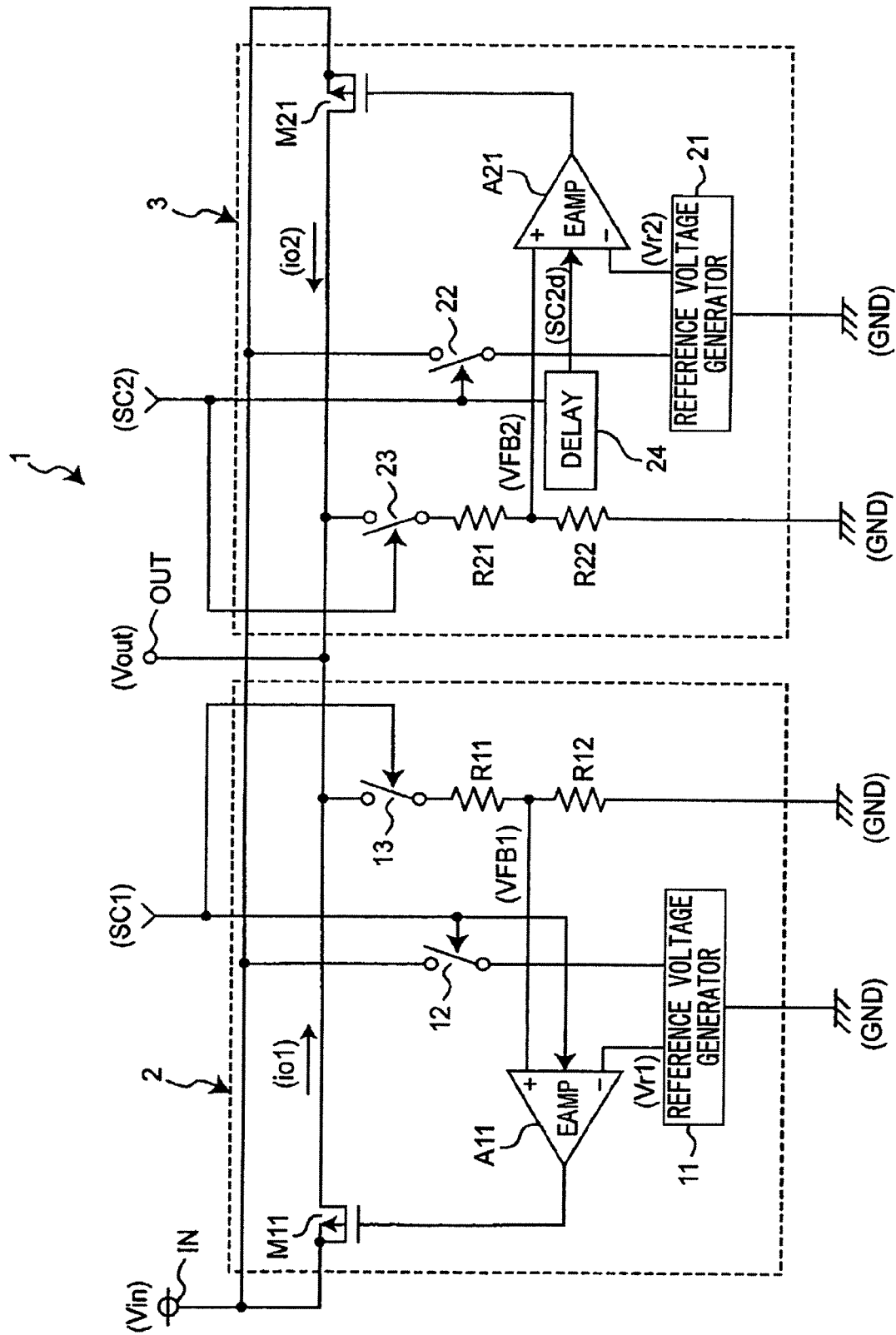
FIG. 10 is a circuit diagram illustrating another example of the constant-voltage power supply circuit according to the second embodiment of the present invention.
Figure 11:
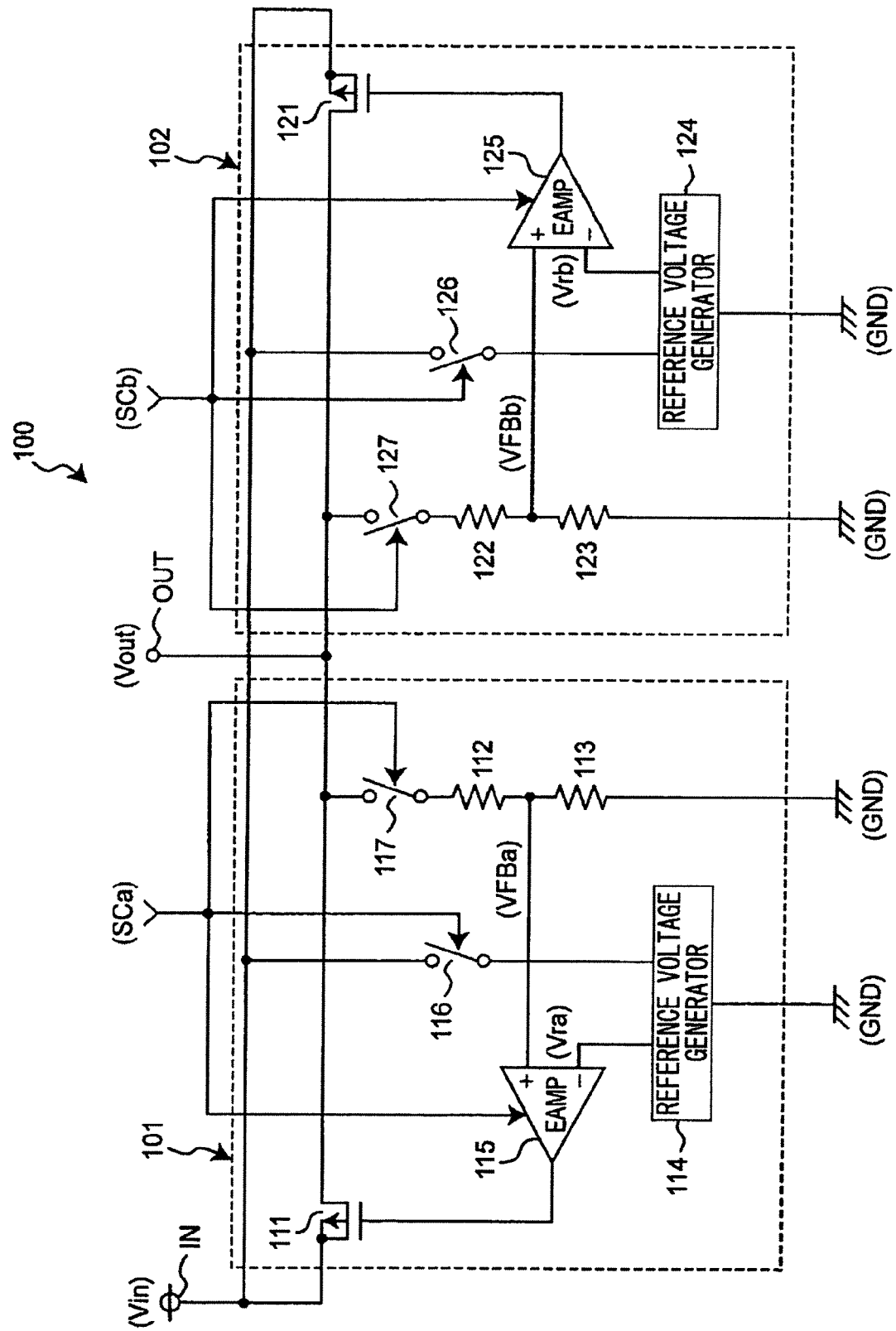
FIG. 11 is a circuit diagram illustrating a constant-voltage power supply circuit of the related art.
Figure 12:
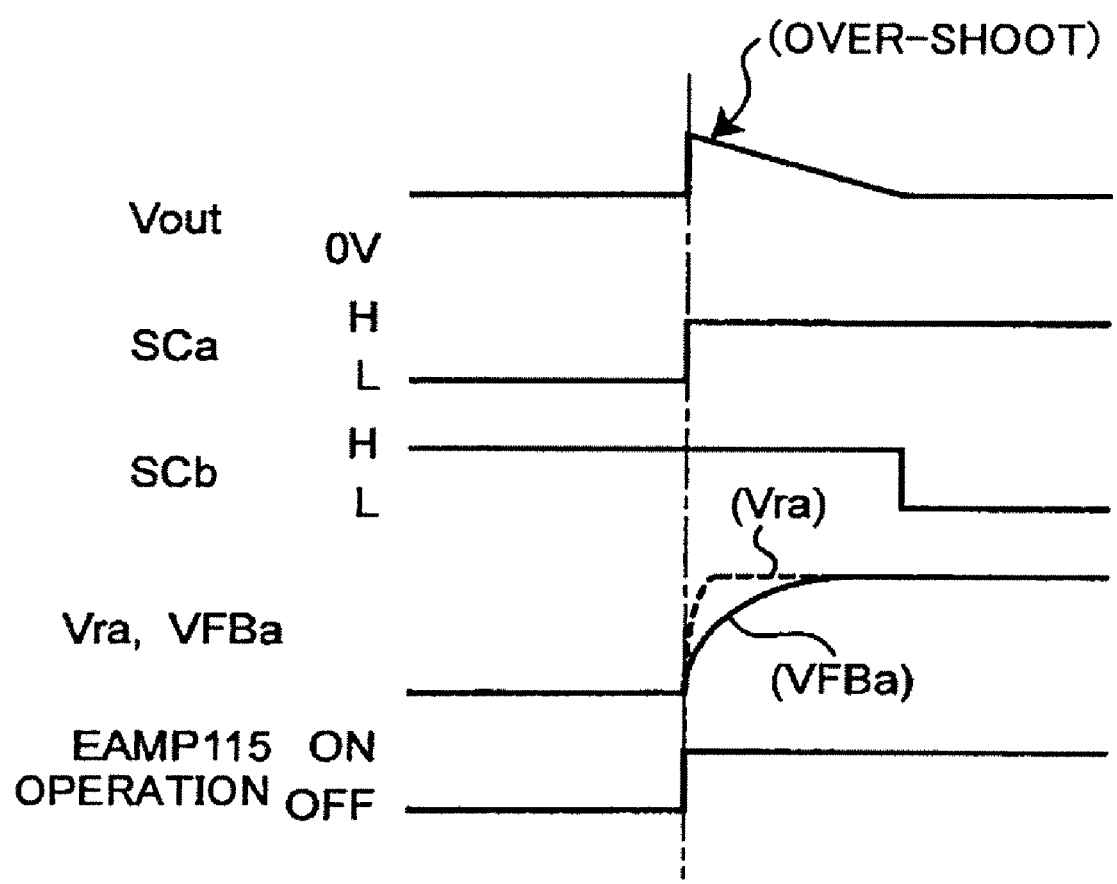
FIG. 12 is a time chart illustrating waveforms of signals in the constant-voltage power supply circuit as shown in FIG. 11.

FIG. 10 is a circuit diagram illustrating another example of the constant-voltage power supply circuit according to the second embodiment of the present invention.

When the constant-voltage circuit 3 has a faster response to the change of the output voltage Vout than the constant-voltage circuit 2, as shown in FIG. 10, the delay circuit 14 as shown in FIG. 8 may be omitted, and a delay circuit for delaying the control signal SC2 may be provided only in the constant-voltage circuit 3. With such a circuit configuration, similar to that shown in FIG. 9, the overshoot does not occur in the output voltage Vout.

According to the present embodiment, the constant-voltage circuit 2 and the constant-voltage circuit 3 share the output terminal OUT; when the constant-voltage circuit 2 or the constant-voltage circuit 3 is to start operations, the operation start timing of the error amplifier in the constant-voltage circuit to be in operation may be delayed by a preset delay time with a delay circuit. Due to this, the overshoot of the output voltage is preventable, which overshoot possibly occurs when switching over the constant-voltage circuits, and thus it is possible to supply a constant output voltage.

The constant-voltage power supply circuits described in the above embodiments can be integrated into one chip.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2005-159764 filed on May 31, 2005, and the entire contents of which are hereby incorporated by reference.

What is claimed is:

1. A power supply circuit, comprising:
   a first constant-voltage circuit comprising:
      a first operator circuit,
      a first reference voltage generator for generating a first reference voltage and for sending the first reference voltage to the first operator circuit,
      a first proportional voltage generator for generating a first proportional voltage and for sending the first proportional voltage to the first operator circuit, and
      a first delay circuit for delaying an operation of the first operator circuit for a first predetermined time period,
      wherein the first delay circuit is arranged at a location to delay a first activation signal from reaching the first reference voltage generator.

2. The power supply circuit of claim 1, further comprising:
   a second constant-voltage circuit comprising:
      a second operator circuit,
      a second reference voltage generator for generating a second reference voltage and for sending the second reference voltage to the second operator circuit, and
      a second proportional voltage generator for generating a second proportional voltage and for sending the second proportional voltage to the second operator circuit.

3. The power supply circuit of claim 2, further comprising a second delay circuit for delaying an operation of the second operator circuit for a second predetermined time period.

4. The power supply circuit of claim 3, wherein the first predetermined time period is equal to a time it takes for the first proportional voltage to rise and wherein the second predetermined time period is equal to a time it takes for the second proportional voltage to rise.

5. The power supply circuit of claim 3, wherein the first delay circuit is arranged at a location to delay the first reference voltage from reaching the first operator circuit and wherein the second delay circuit is arranged at a location to delay the second reference voltage from reaching the second operator circuit.

6. The power supply circuit of claim 2, further comprising a first output transistor that outputs a current corresponding to an output of the first error amplifier and a second output transistor that outputs a current corresponding to an output of the second error amplifier.

7. The power supply circuit of claim 2, wherein the first delay circuit is arranged at a location to delay the first reference voltage from reaching the first operator circuit.

8. The power supply circuit of claim 1, wherein the first operator circuit comprises a first error amplifier for amplifying a difference between the first reference voltage and the first proportional voltage.

9. The power supply circuit of claim 1, further comprising a first output transistor that outputs a current corresponding to an output of the first error amplifier.

10. The power supply circuit of claim 1, wherein the first predetermined time period is equal to a time it takes for the first proportional voltage to rise.

11. The power supply circuit of claim 1, wherein the first delay circuit is arranged at a location to delay the first reference voltage from reaching the first operator circuit.

12. The power supply circuit of claim 1, wherein the first delay circuit is arranged at a location to delay a first activation signal from reaching the first operator circuit.

13. A power supply circuit, comprising:
   a first constant-voltage circuit comprising:
      a first error amplifier,
      a first output transistor that outputs a first output voltage corresponding to an output of the first error amplifier,
      a first reference voltage generator for generating a first reference voltage in response to an input voltage and for sending the first reference voltage to the first error amplifier,
      a first proportional voltage generator for generating a first proportional voltage in response to the first output voltage and for sending the first proportional voltage to the first operator circuit, and
      a first delay circuit for delaying an operation of the first error amplifier for a first predetermined time period; and
   a second constant-voltage circuit comprising:
      a second error amplifier,
      a second output transistor that outputs a second output voltage corresponding to an output of the second error amplifier,
      a second reference voltage generator for generating a second reference voltage in response to the input voltage and for sending the second reference voltage to the second error amplifier, and
      a second proportional voltage generator for generating a second proportional voltage in response to the second output voltage and for sending the second proportional voltage to the second operator circuit.

14. A method of operating a power supply circuit, comprising:
   generating a first reference voltage using a first reference voltage generator;
   generating a first proportional voltage using a first proportional voltage generator;
   sending the first reference voltage and the first proportional voltage to a first operator circuit; and
   delaying an operation of the first operator circuit for a first predetermined time period using a first delay circuit,
   wherein the first delay circuit is arranged at a location to delay a first activation signal from reaching the first reference voltage generator.

15. The method of claim 14, further comprising:
   generating a second reference voltage;
   generating a second proportional voltage; and
   sending the second reference voltage and the second proportional voltage to a second operator circuit.

16. The method of claim 15, further comprising delaying an operation of the second operator circuit for a second predetermined time period.

17. The method of claim 16, further comprising delaying the first reference voltage from reaching the first operator circuit.

* * * * *